W. B. AYER.
SIGNAL DEVICE FOR AUTOMOBILES.
APPLICATION FILED OCT. 18, 1917.
1,315,697.
Patented Sept. 9, 1919.
2 SHEETS—SHEET 2.
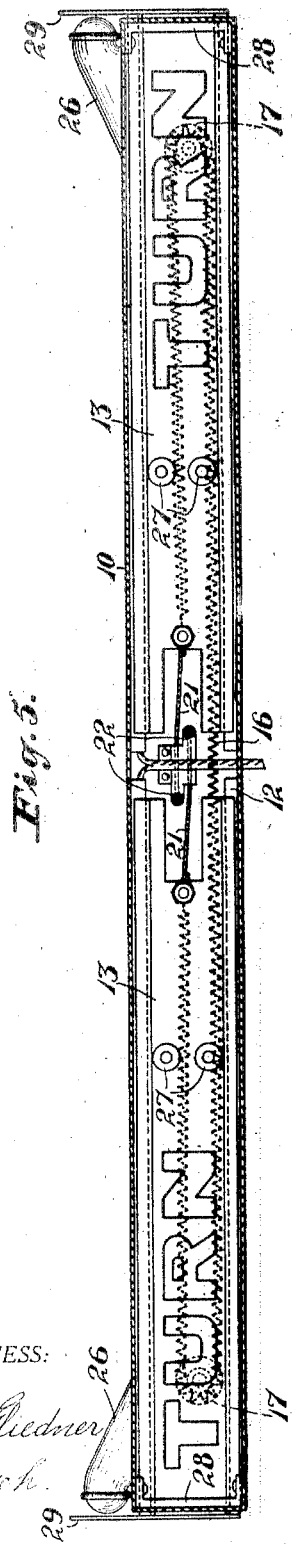
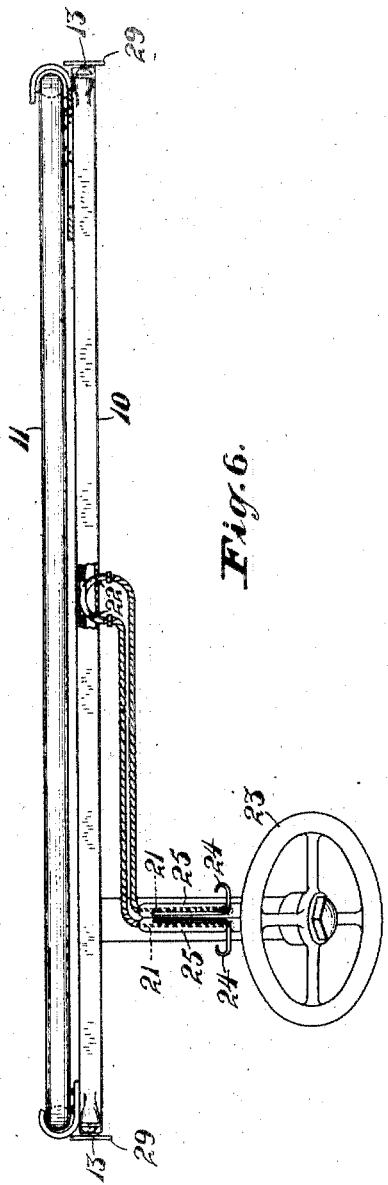
WITNESS:
INVENTOR.
William B. Ayer
BY Strong & Townsend
ATTORNEYS.

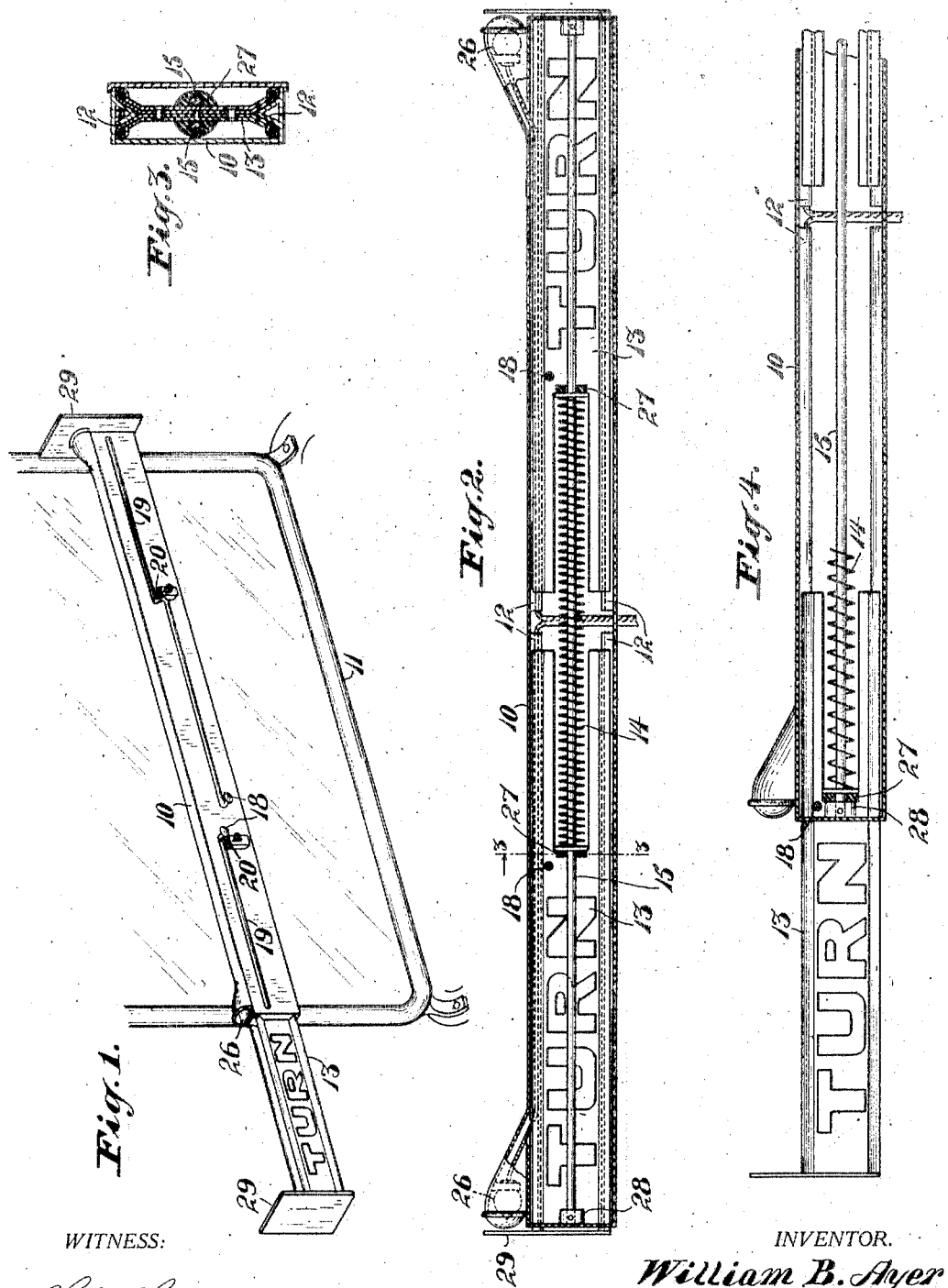

UNITED STATES PATENT OFFICE.

WILLIAM B. AYER, OF BERKELEY, CALIFORNIA.

SIGNAL DEVICE FOR AUTOMOBILES.

1,315,697.      Specification of Letters Patent.      Patented Sept. 9, 1919.

Application filed October 18, 1917. Serial No. 197,237.

*To all whom it may concern:*

Be it known that I, WILLIAM B. AYER, a citizen of the United States, residing at Berkeley, in the county of Alameda and State of California, have invented new and useful Improvements in Signal Devices for Automobiles, of which the following is a specification.

This invention relates to signal devices for automobiles; and has for its object to provide a simple, inexpensive and conveniently operated signal which will be effective to indicate to pedestrians, traffic officers, and occupants of vehicles, both at the front and rear, the intention of the operator, particularly with respect to turning.

The device comprises a frame or housing adapted to be detachably connected to the windshield or dashboard of an automobile, and within which are two sign members slidably mounted and normally concealed, spring means for pressing the sign members outwardly when the latter are released, and manually operated means for retracting the signs after they have been extended.

In the drawings:

Figure 1 shows a perspective view of a device embodying my invention applied to the windshield of an automobile.

Fig. 2 shows a longitudinal, central, sectional view of the same.

Fig. 3 shows a cross sectional view, taken on the line 3—3 of Fig. 2.

Fig. 4 shows a fragmentary sectional view of the device, with one of the sign members extended.

Fig. 5 shows a sectional view of a modified form of the device.

Fig. 6 shows a plan view of the same with connections for retracting the sign members located upon the steering post of the automobile.

I show a frame or housing 10 detachably connected to the windshield or dashboard 11 of an automobile by any suitable means. Within the housing and slidably mounted on guides 12 are two sign members 13 projectable through opposite ends of the housing but normally concealed within.

In Figs. 2 and 3 I show an extensible coil spring 14 mounted upon rods 15 for pressing the signs outwardly, one spring answering for both sides. In Fig. 5 another form of spring is substituted which comprises a flexible and contractible coil spring 16 running over pulleys 17, at each end of the housing, and connected at each end to one of the sign members near the inner end of the latter.

The means for latching the sign members in retracted and concealed position preferably comprises a button or lug 18 on each projecting through a slot 19 in the front of the housing and coöperating with a notch or latch 20 at the inner end of the slot. When one of the buttons is released, the sign member connected therewith is thrown outwardly, as shown in Fig. 1, to the side of the car toward which it is the intention of the driver to turn.

In cases where the windshield or dashboard is close to the driver's seat, the buttons 18 may also be used to retract the signs. However in other situations I may employ ropes or flexible connections 21, as shown in Figs. 5 and 6, secured to the inner ends of the sign members and extending through guides 22 and passing outwardly through the front of the housing to a point accessible to the operator as, for instance, the steering wheel 23 where their ends may be fitted with handles 24 working in bayonet-jointed guides 25. A pull on the button or handle serves to return the sign member to concealed position, whereupon the latch devices 20 or bayonet joints, as the case may be, serve to automatically lock the same in place. If desired, an incandescent light 26 may be arranged at each end of the housing to illuminate the projected sign.

The device is of simple and economical construction and easily operated. It offers the advantage that warning is given to pedestrians in front as well as occupants of vehicles at the rear when the change in the course of travel is contemplated.

For each sign member I provide one or more bumpers 27, preferably of rubber, which, in the form shown in Fig. 5, are arranged on the sign member near the inner end thereof and in the case of the form shown in Fig. 2 are slidable on the rods 15. These bumpers are adapted to strike against a stop 28 on the inside of the casing at the end thereof; the stop device of Fig. 5 being in the form of a bar secured in place by means of rivets or bolts projecting through the upper and lower portions of the casing and entering the bent ends of the bar; and in the case of Fig. 2 being in the form of bosses on the ends of the rods. Such an arrangement provides a positive and not easily injured stop for the sign members.

Where the signal is used on an inclosed casing, slots or openings may be formed in the sides thereof near the dashboard or wind shield, through which the sign members project, and these openings may be closed by means of shields 29, on the outer ends of the sign members, which shields here serve as reflectors for the lights 26.

In the majority of automobiles the casing may be arranged on the dashboard, but where other instruments are present to interfere it can be placed on the wind shield far enough down to not interfere with the vision of the driver. Since the lower half of the wind shield opens outwardly at its bottom and the casing is on the inside there is no interference with the normal operation of the wind shield.

Having thus described my invention, what I claim and desire to secure by Letters Patent is—

1. In a signal device for automobiles, a casing, an upper and lower guide in the casing extending longitudinally thereof and arranged between and in spaced relation to the front and back of the casing, said guides being of substantially V-shape in cross section with their apices confronting each other, a pair of plates in the casing having their sides turned outwardly at an angle and engaged with the respective sloping sides of the guides and also with the front and back respectively of the casing, spring means for moving the plates to signaling positions, and releasable means to hold the plates against the action of the spring means.

2. In a signal device for automobiles, a casing, an upper and a lower guide in the casing extending longitudinally thereof and arranged between and in spaced relation to the front and back of the casing, said guides being of substantially V-shape in cross section with their apices confronting each other, a pair of plates in the casing having their sides turned outwardly at an angle and engaging with the respective sloping sides of the guides and also with the front and back respectively of the casing, spring means for moving the plates to signaling position including a rod on each plate, a single coil spring common to each rod and encircling both of the latter and connected at its ends to the respective rods for moving either plates independent of the other to signaling position, and releasable means to hold the plates against the action of the spring.

In testimony whereof I have hereunto set my hand in the presence of two subscribing witnesses.

WILLIAM B. AYER.

Witnesses.
JOHN H. HERRING,
W. W. HEALEY.